United States Patent
Tanaka et al.

(10) Patent No.: US 9,878,655 B2
(45) Date of Patent: Jan. 30, 2018

(54) VEHICLE LAMP

(71) Applicant: KOITO MANUFACTURING CO., LTD., Minato-ku, Tokyo (JP)

(72) Inventors: Hidetada Tanaka, Shizuoka (JP); Yuichi Shibata, Shizuoka (JP); Misako Nakazawa, Shizuoka (JP); Michihiko Hayakawa, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/757,553

(22) Filed: Dec. 24, 2015

(65) Prior Publication Data

US 2016/0185276 A1    Jun. 30, 2016

(30) Foreign Application Priority Data

Dec. 25, 2014    (JP) .................... 2014-262977

(51) Int. Cl.
  *B60Q 1/08* (2006.01)
  *B60Q 1/14* (2006.01)
  *F21S 8/10* (2006.01)

(52) U.S. Cl.
  CPC ............ *B60Q 1/085* (2013.01); *B60Q 1/143* (2013.01); *F21S 48/1159* (2013.01); *F21S 48/1317* (2013.01); *F21S 48/1742* (2013.01); *B60Q 2300/054* (2013.01); *B60Q 2300/056* (2013.01); *B60Q 2300/312* (2013.01); *B60Q 2300/42* (2013.01)

(58) Field of Classification Search
  CPC ......... B60Q 1/085; B60Q 1/143; B60Q 1/12; B60Q 1/124; B60Q 2300/122; B60Q 2300/22; B60Q 2300/42; B60Q 2300/312; F21S 48/1742; F21S 48/1757
  See application file for complete search history.

(56) References Cited

U.S. PATENT DOCUMENTS 6,343,869 B1 * 2/2002 Kobayashi ............. B60Q 1/085
                                                         315/77
6,456,206 B1 * 9/2002 Rocca .................. B60Q 1/2603
                                                        307/10.8
6,481,876 B2 * 11/2002 Hayami ................ B60Q 1/085
                                                        362/276

(Continued)

FOREIGN PATENT DOCUMENTS

CN        101023407 A    8/2007
CN        101559733 A    10/2009

(Continued)

OTHER PUBLICATIONS

Communication issued by the State Intellectual Property Office of P.R. China dated Sep. 21, 2017 in counterpart Chinese Patent Application No. 201510993876.5.

*Primary Examiner* — Julie Bannan
(74) *Attorney, Agent, or Firm* — Sughrue Mion, PLLC

(57) ABSTRACT

A vehicle lamp includes a first light source that emits light of a first brightness, a second light source that emits light of a second brightness higher than the first brightness, an actuator that changes the direction of light emitted from the first light source and the second light source, and an ADB control device that controls the light output of the second light source and the actuator so as to be associated with each other in accordance with a driving condition of a vehicle.

11 Claims, 9 Drawing Sheets

(56) References Cited

U.S. PATENT DOCUMENTS

| | | | |
|---|---|---|---|
| 7,322,724 B2* | 1/2008 | Kletensky | B60Q 1/12 362/276 |
| 2003/0227777 A1* | 12/2003 | Schofield | B60Q 1/1423 362/460 |
| 2004/0143380 A1* | 7/2004 | Stam | B60Q 1/085 701/36 |
| 2009/0190324 A1 | 7/2009 | Watanabe et al. | |
| 2011/0012510 A1* | 1/2011 | Tani | B60Q 1/1423 315/82 |
| 2011/0210667 A1* | 9/2011 | Shiao | B60Q 1/076 315/82 |
| 2012/0051071 A1* | 3/2012 | Okubo | F21S 48/1159 362/465 |
| 2012/0286687 A1* | 11/2012 | Kikuchi | H05B 33/0851 315/224 |
| 2012/0320617 A1* | 12/2012 | Ohno | F21S 2/005 362/516 |
| 2013/0027951 A1 | 1/2013 | Takahashi et al. | |
| 2013/0077335 A1* | 3/2013 | Murley | F21S 48/1104 362/517 |
| 2013/0107564 A1* | 5/2013 | Yatsuda | F21S 48/1159 362/543 |
| 2013/0121011 A1* | 5/2013 | Langkabel | B60Q 1/04 362/520 |
| 2013/0155704 A1 | 6/2013 | Takagaki | |
| 2014/0071702 A1* | 3/2014 | Faber | B60Q 1/085 362/466 |
| 2014/0233805 A1* | 8/2014 | Faber | G01W 1/00 382/104 |
| 2014/0321138 A1* | 10/2014 | Takenaka | B60Q 1/0094 362/511 |
| 2014/0328079 A1* | 11/2014 | Itagaki | F21V 29/02 362/547 |
| 2014/0355286 A1* | 12/2014 | Arita | F21S 48/1323 362/516 |

FOREIGN PATENT DOCUMENTS

| | | |
|---|---|---|
| CN | 102901017 A | 1/2013 |
| CN | 103249597 A | 8/2013 |
| JP | 2012-162121 A | 8/2012 |
| JP | 2013-256292 A | 12/2013 |
| JP | 2014-78476 A | 5/2014 |

* cited by examiner

HIGH BEAM      SPOT HIGH BEAM

VEHICLE LAMP

CROSS-REFERENCE TO RELATED APPLICATION

The present application claims priority from Japanese Patent Application No. 2014-262977 filed on Dec. 25, 2014, the entire content of which is incorporated herein by reference.

BACKGROUND

Technical Field

The present invention relates to a vehicle lamp where a light distribution pattern can be changed in accordance with a driving condition of a vehicle.

In a related-art vehicle headlamp, there has been known an ADB (Adaptive Driving Beam) system for controlling a high-beam light distribution pattern in accordance with a position of a preceding vehicle. For example, Patent Document 1 discloses a headlamp where a swivel control for laterally changing an irradiation direction of a high beam in accordance with a travelling direction of own vehicle is performed, in addition to the ADB control of the light distribution pattern. Further, Patent Document 2 has proposed a vehicle lamp where a leveling control for vertically changing an irradiation direction of a high beam is performed, in addition to the swivel control.

Patent Document 1: Japanese Patent Laid-Open Publication No. 2012-162121

Patent Document 2: Japanese Patent Laid-Open Publication No. 2013-256292

By the way, in order to change the light distribution pattern or the irradiation direction in accordance with the driving condition, a high response is required for a movable part. Accordingly, in the related art, there has been an attempt to reduce the mass of the whole movable part by using a semiconductor light source such as an LED or LD. Particularly, since the LD can irradiate a spot light to the far place, the LD has an advantage capable of forming various light distribution patterns by being combined with the LED having a relatively low brightness. However, in the case where the irradiation direction of a laser beam is changed by the related-art ADB control, there is a problem that a direct light gives glare to a driver of oncoming vehicle or a reflected light lowers the visibility of a driver of own vehicle.

SUMMARY

Exemplary embodiments of the invention provide a vehicle lamp capable of forming various light distribution patterns by using a high-brightness light source and a low-brightness light source in combination.

A vehicle lamp according to an exemplary embodiment, comprises:

a first light source that emits light of a first brightness (a low-brightness light source that emits light of a relatively low brightness);

a second light source that emits light of a second brightness higher than the first brightness (a high-brightness light source that emits light of a relatively high brightness);

an actuator that changes the direction of light emitted from the first light source and the second light source; and an ADB control device that controls the light output of the second light source and the actuator so as to be associated with each other in accordance with a driving condition of a vehicle.

Here, as the low-brightness light source and the high-brightness light source, a semiconductor light source can be preferably used. For example, an LED can be used as the low-brightness light source and an LD can be used as the high-brightness light source. Alternatively, a low-brightness type LED and a high-brightness type LED may be used in combination. As the actuator, a swivel actuator for driving both the low-brightness light source and the high-brightness light source in a horizontal direction or a leveling actuator for separately driving both light sources in a vertical direction, or the like can be used. Further, the ADB control device is adapted to control the actuator and the light output of the high-brightness light source in association as follows.

(A) The ADB control device performs a control of lowering the light output of the second light source than the current light output when the light emitted from the second light source is directed to an oncoming vehicle.

(B) The ADB control device performs a control of lowering the light output of the second light source than the current light output when the light emitted from the second light source is directed to a retro-reflective object.

(C) The ADB control device performs a control of increasing the light output of the second light source when the light emitted from the second light source is directed to an extending direction of a curved road.

(D) The ADB control device performs a control of changing the light output of the second light source from Low to High when the light emitted from the second light source is switched from downward to upward.

(E) During heavy weather, the ADB control device performs a control of directing an optical axis of the second light source toward a road surface and lowering or stopping the light output of the first light source.

According to the vehicle lamp of the present invention, when performing the ADB control, the light output of the high-brightness light source is controlled in association with the irradiation direction. Therefore, it is possible to achieve an excellent effect capable of forming various light distribution patterns without giving glare to a driver of the other vehicle or own vehicle.

DETAILED DESCRIPTION

Figure 1:
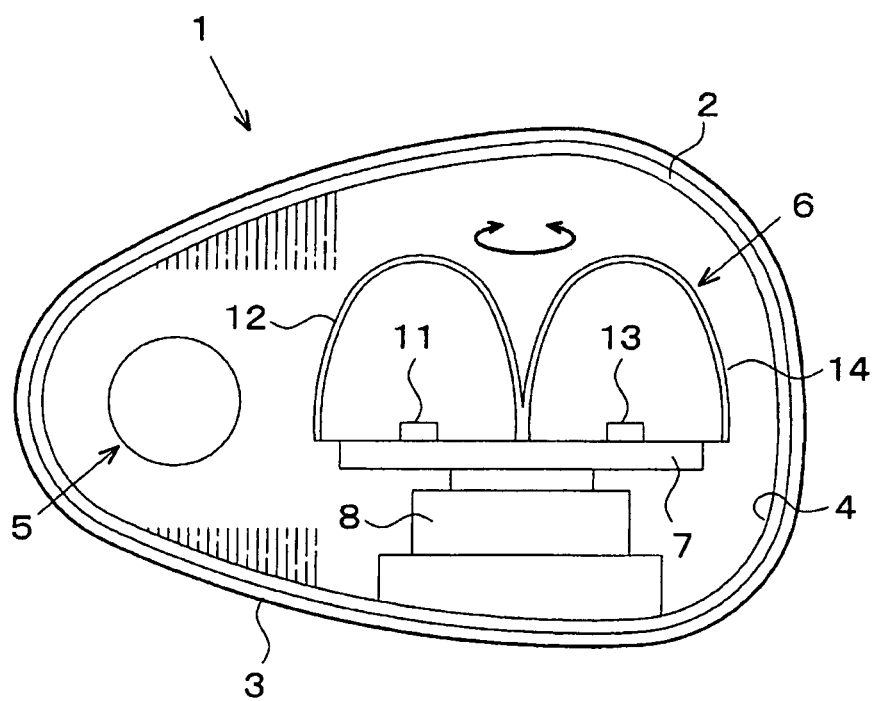
FIG. 1 is a front view of a vehicle headlamp showing an exemplary embodiment of the present invention.
Figure 2:
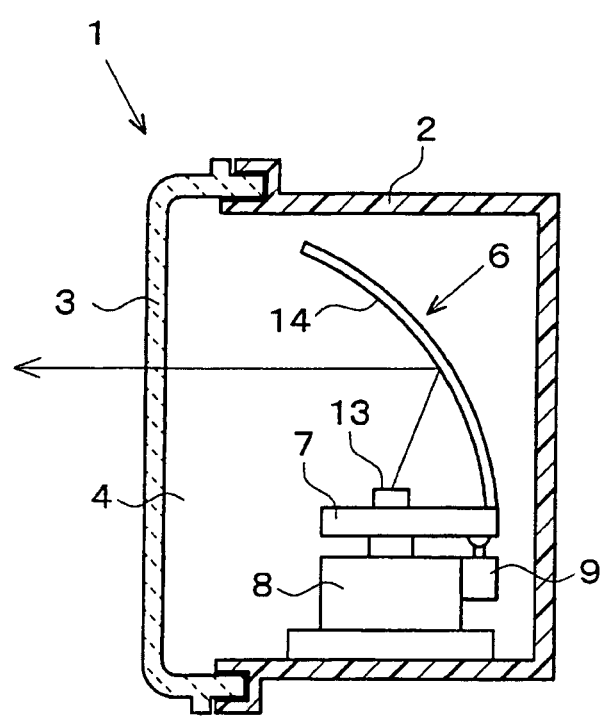
FIG. 2 is a vertical sectional view of the headlamp shown in FIG. 1.

Hereinafter, an embodiment for embodying the present invention into a headlamp will be described with reference to the drawings. A vehicle headlamp 1 shown in FIGS. 1 and 2 is configured so that a lamp chamber 4 is formed between a lamp housing 2 and a front cover 3 and a low-beam unit 5 and a high-beam unit 6 are mounted in the lamp chamber 4. In the high-beam unit 6, a light source base 7, a swivel actuator 8 for swiveling the light source base 7 in the horizontal direction, and a leveling actuator 9 for tilting the light source base 7 in the vertical direction are provided.

On the light source base 7, a low-brightness light source 11 for emitting light of a relatively low brightness, a first reflector 12 for reflecting the light emitted from the low-brightness light source 11 toward the front of a vehicle, a high-brightness light source 13 for emitting light of a relatively high brightness, and a second reflector 14 for reflecting the light emitted from the high-brightness light source 13 toward the front of the vehicle are provided. Further, in the present embodiment, an LED is used as the low-brightness light source 11, an LD is used as the high-brightness light source 13, and a parabolic-type reflector mirror is used as the first and second reflectors 12, 14.

Figure 3:
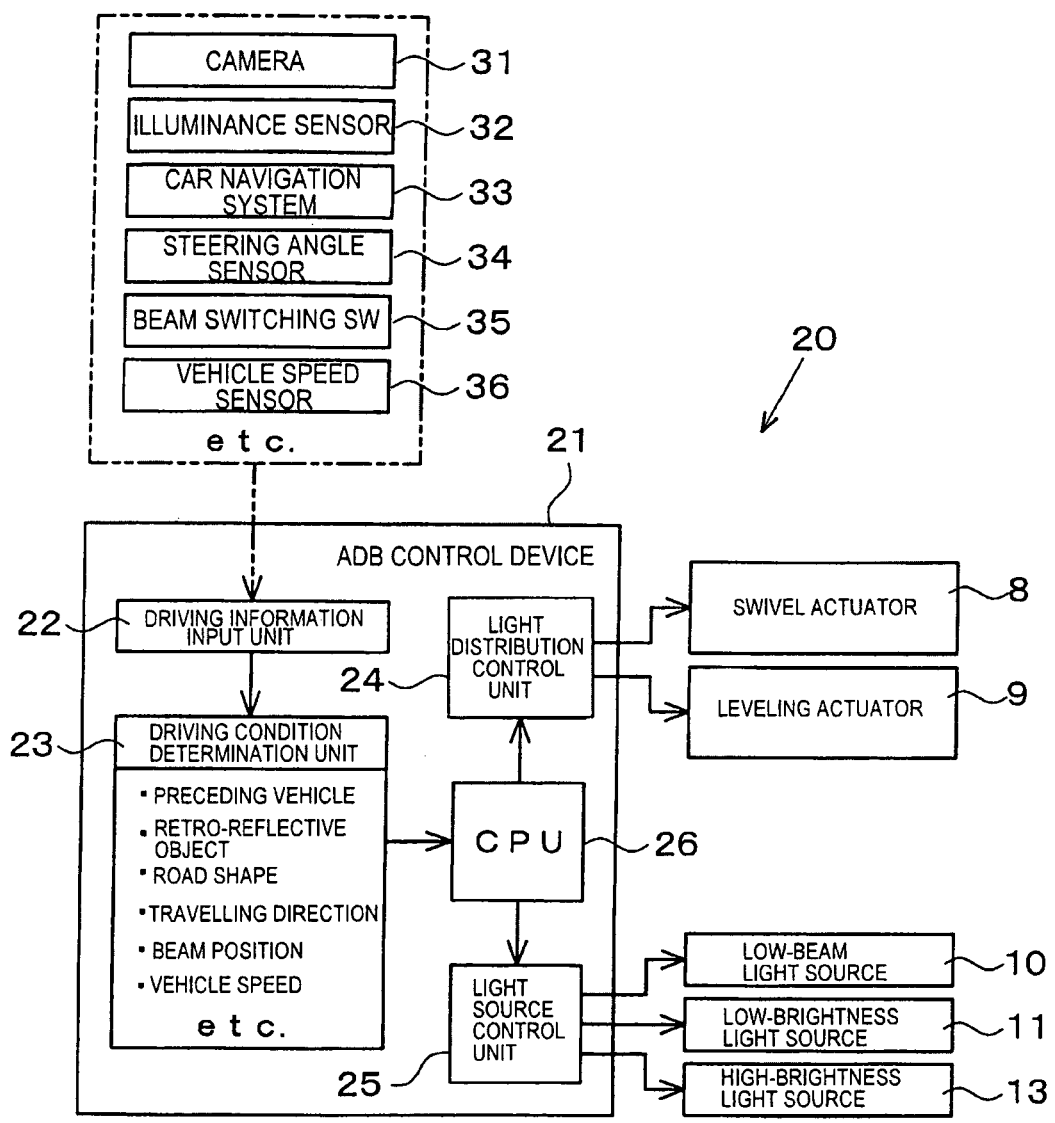
FIG. 3 is a block diagram showing an electrical control system of the headlamp.

As shown in FIG. 3, an electrical control system 20 of the headlamp 1 includes an ADB control device 21 for controlling a light distribution pattern of a high beam in accordance with a driving condition of a vehicle. The ADB control device 21 includes a driving information input unit 22 for inputting the driving information from various sensors, a driving condition determination unit 23 for determining the current driving conditions based on the input information, a light distribution control unit 24 for controlling the swivel actuator 8 and the leveling actuator 9, a light source control unit 25 for controlling the light output of a low-beam light source 10, the low-brightness light source 11 and the high-brightness light source 13, and a CPU 26 for controlling the light distribution control unit 24 and the light source control unit 25 so as to be associated with each other based on the determination results of the driving conditions.

Meanwhile, the information inputted by the driving information input unit 22 includes information detected by a camera 31, an illuminance sensor 32, a car navigation system 33, a steering angle sensor 34, a beam switching switch 35, and a vehicle speed sensor 36, or the like. Further, based on these driving information, the driving condition determination unit 23 is adapted to determine the driving conditions such as a position of a preceding vehicle including an oncoming vehicle, a position of a retro-reflective object such as signs or billboards, a road shape, a travelling direction of own vehicle, a beam position, and a speed of own vehicle.

Figure 4A:
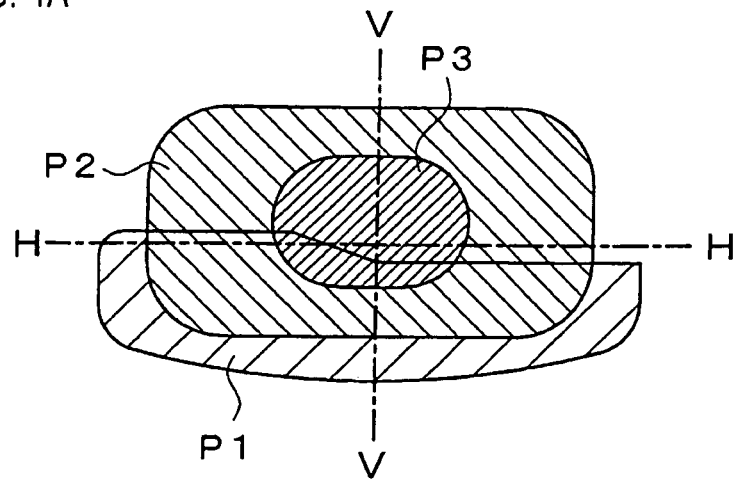
FIGS. 4A and 4B are model diagrams showing a light distribution pattern of the headlamp.
Figure 4B:
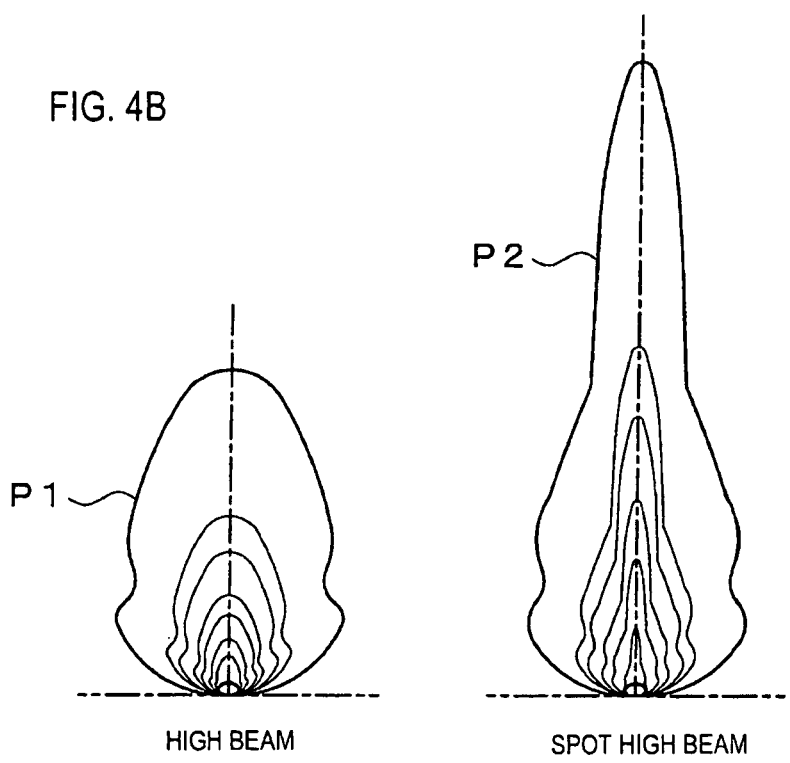

Subsequently, a light distribution variable control by the ADB control device 21 is described. As shown in FIG. 4A, the headlamp 1 of the present embodiment forms a low beam pattern P1 by the light emitted from the low-beam light source 10, forms a high-beam pattern P2 by the light emitted from the low-brightness light source 11, and forms a spot high-beam pattern P3 by the light emitted from the high-brightness light source 13. As shown in FIG. 4B, the spot high-beam pattern P3 is formed in combination with the high-beam pattern P2 and brightly illuminates the front of own vehicle up to 200 m to 500 m.

Figure 5A:
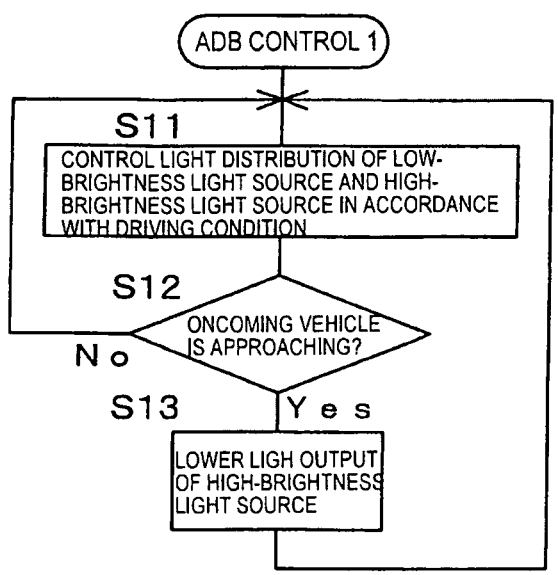
FIGS. 5A to 5C are operation explanatory views showing a first example of an ADB control.
Figure 5B:
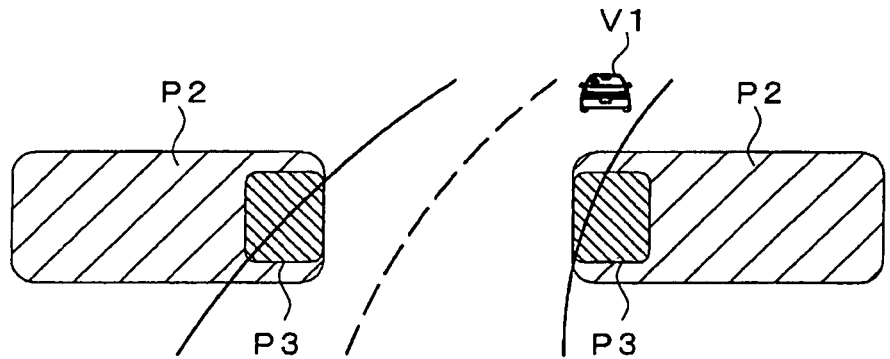
Figure 5C:
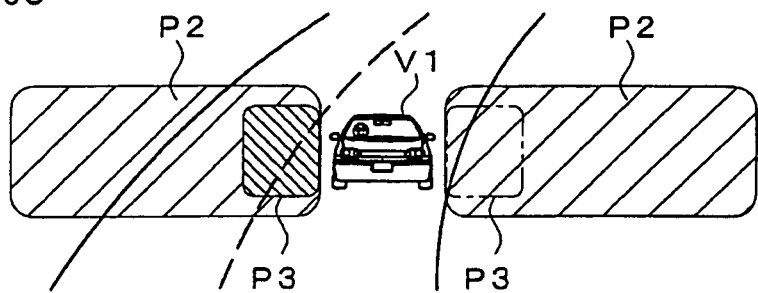

FIGS. 5A to 5C show a first example of a light distribution variable control (ADB control 1). When the beam switching switch 35 is switched from Lo to Hi, the ADB control device 21 performs a light distribution control for changing the direction of light emitted from the low-brightness light source 11 and the high-brightness light source 13, in accordance with the driving conditions (S11). In this way, for example, as shown in FIG. 5B, an outer region of a road is illuminated by the high-beam pattern P2 of left and right headlamps 1 and a road shoulder can be more brightly illuminated by the spot high-beam pattern P3.

As, in this state, an oncoming vehicle V1 is approaching own vehicle (not shown), the ADB control device 21 determines a relative position of the own vehicle and the oncoming vehicle V1 based on the image information of the camera 31. When the oncoming vehicle V1 approaches up to a position where the illumination light of the own vehicle reaches the oncoming vehicle V1 (S12), as shown in FIG. 5C, the ADB control device 21 performs a control of reducing or stopping the light output of the high-brightness light source 13 in one-side headlamp 1 which illuminates the lane on the oncoming vehicle V1 side (S13). According to the control of the first example, the spot high-beam pattern P3 of high brightness directed toward the oncoming vehicle V1 is instantly dimmed or extinguished. Therefore, the glare given to a driver of the oncoming vehicle V1 can be prevented in advance without generating the response delay as in the related-art ADB control.

Figure 6A:
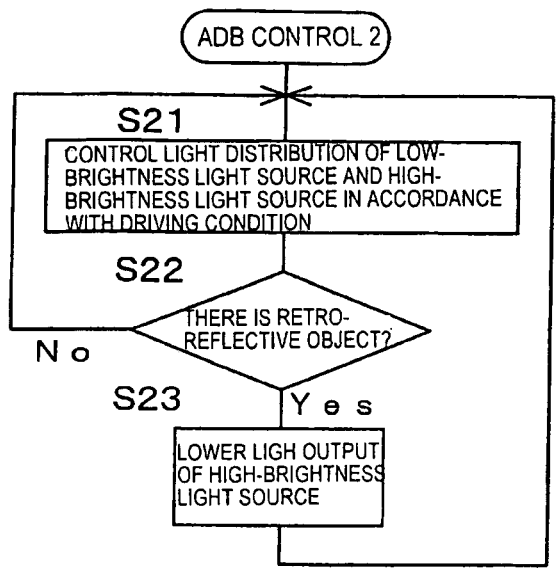
FIGS. 6A and 6B are operation explanatory views showing a second example of the ADB control.
Figure 6B:
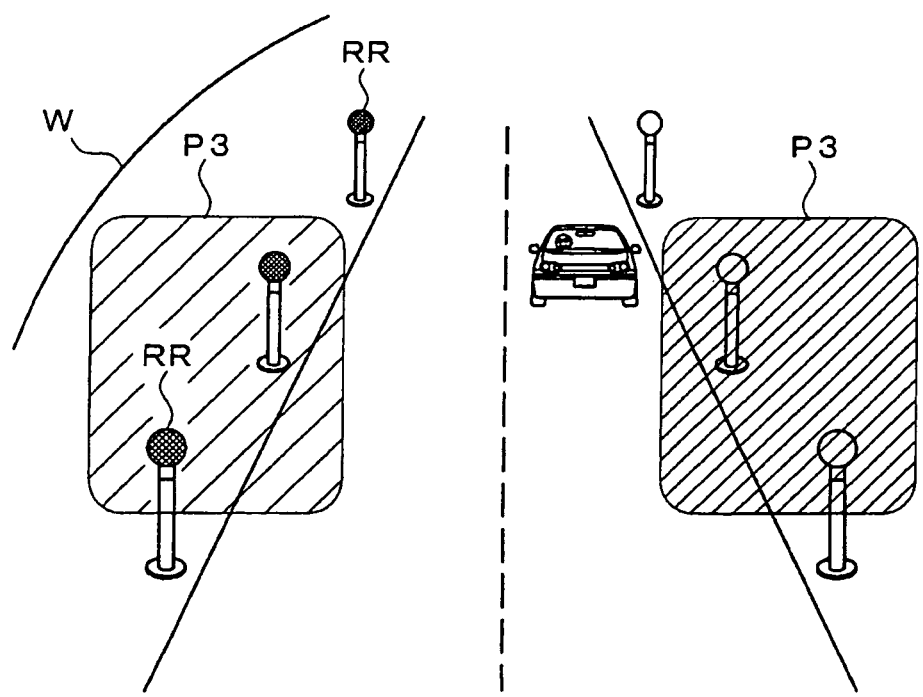

FIGS. 6A and 6B show a second example of the light distribution variable control (ADB control 2). Here, during the light distribution control of the low-brightness light source 11 and the high-brightness light source 13 (S21), the ADB control device 21 performs a control of lowering the light output of the high-brightness light source 13 in the headlamp 1 which illuminates the own vehicle lane side (S23) when the presence of a predetermined number of retro-reflective objects RR such as delineators or signs is determined in front of own vehicle (not shown) on the basis of the detection information of the illuminance sensor 32 (S22). According to the control of the second example, the glare given to a driver of the own vehicle by the reflected light from the retro-reflective objects RR does not occur and the signs can be also easily confirmed. Meanwhile, in a road such as a highway where many signs are present, the ADB control 2 can be started concurrently with the entry into the road. The control of lowering the light output of the high-brightness light source 13 in the headlamp 1 on the own vehicle lane side may be performed when the reflected light from a mountain surface or a wall surface W at the side of the road is detected, in addition to the signs.

Figure 7A:
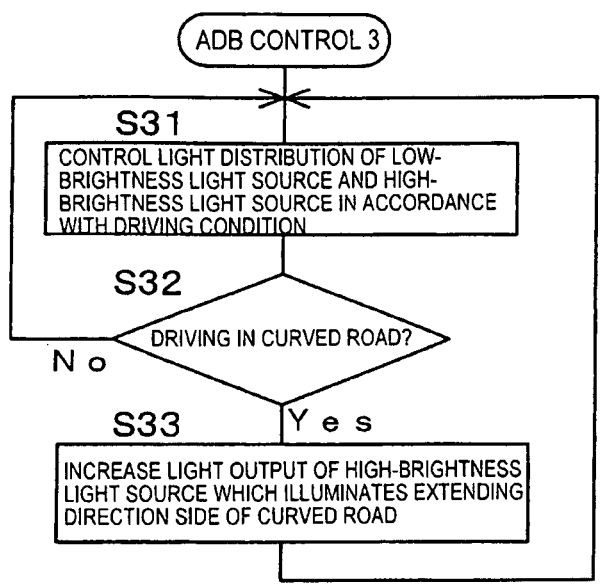
FIGS. 7A and 7B are operation explanatory views showing a third example of the ADB control.
Figure 7B:
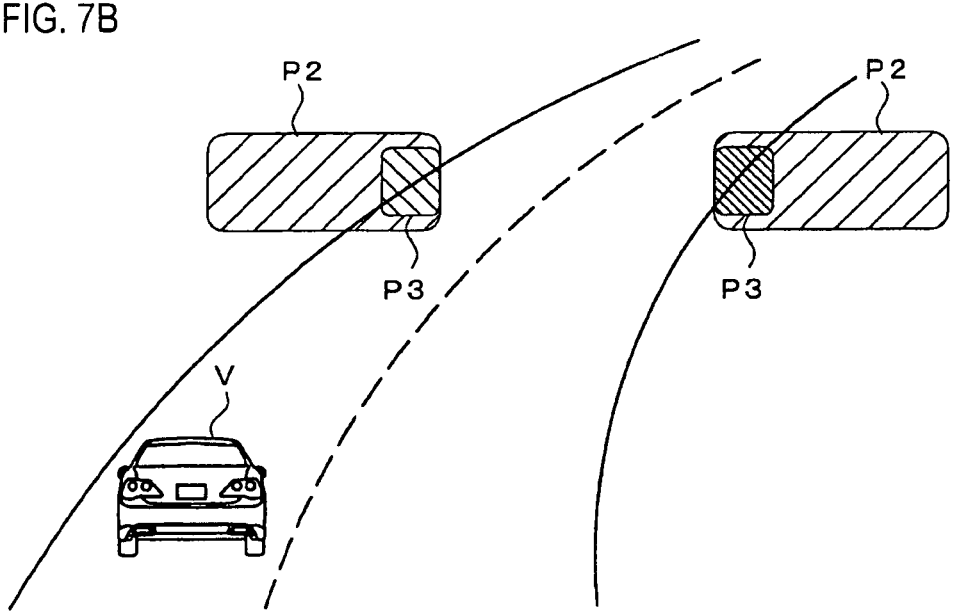

FIGS. 7A and 7B show a third example of the light distribution variable control (ADB control 3). Here, during the light distribution control of the low-brightness light source 11 and the high-brightness light source 13 (S31), the ADB control device 21 determines that the own vehicle V is travelling on a curved road on the basis of the steering information inputted from the steering angle sensor 34 or the road information inputted from the car navigation system 33. Further, the ADB control device 21 performs a control of relatively increasing the light output of the high-brightness light source 13 in the headlamp 1 which illuminates an extending direction side (a right side in FIG. 7B) of the curved road, and performs a control of relatively lowering the light output of the high-brightness light source 13 in the headlamp 1 which illuminates the opposite side of the extending direction of the curved road (S33). According to the control of the third example, during the travelling on the curved road, the brightness is changed in association with the direction of the spot high-beam pattern P3. As a result, there is an advantage capable of brightly illuminating the far place in the travelling direction in which a driver is likely to watch carefully.

Figure 8A:
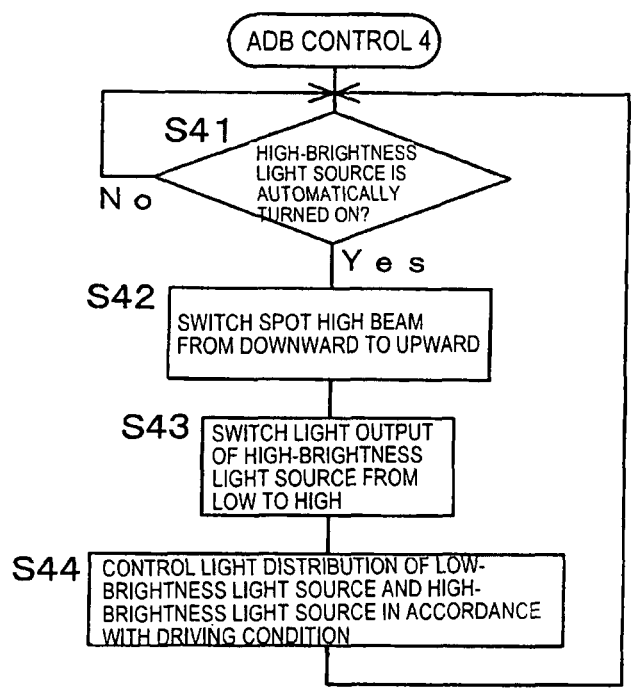
FIGS. 8A and 8B are operation explanatory views showing a fourth example of the ADB control.
Figure 8B:
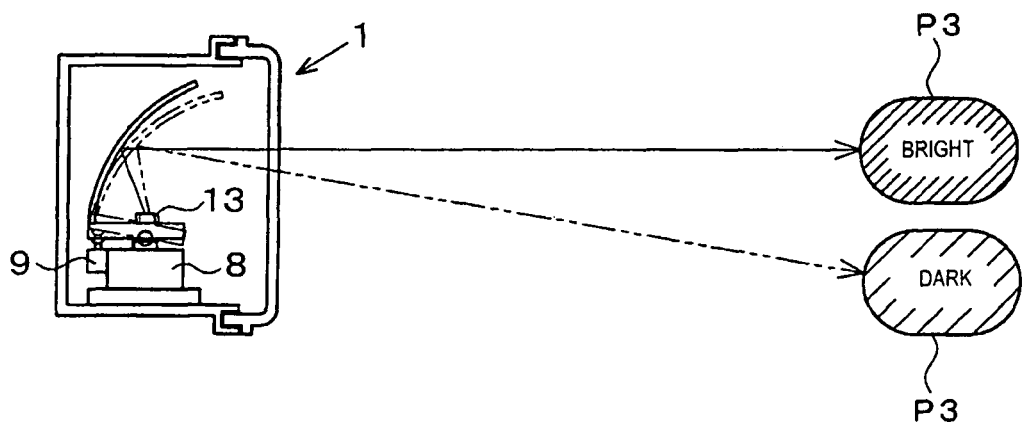

FIGS. 8A and 8B show a fourth example of the light distribution variable control (ADB control 4). Here, when the high-brightness light source 13 is automatically turned on in accordance with a driving condition (S41), the ADB control device 21 first drives the leveling actuator 9 to change the irradiation direction of the spot high-beam pattern P3 from an initial downward position to a normal upward position (S42), and then, gradually changes the light output of the high-brightness light source 13 from Low to High in accordance with the tilting of the spot high-beam pattern P3 (S43), and then, performs a light distribution control of the low-brightness light source 11 and the high-brightness light source 13 in accordance with the driving condition (S44). According to the control of the fourth example, the darkness is changed in association with the direction of the spot high-beam pattern P3. As a result, a driver who is not aware of the automatic lighting of the high-brightness light source 13 can be made to enjoy the functionality and mobility specific for the ADB control.

Figure 9A:
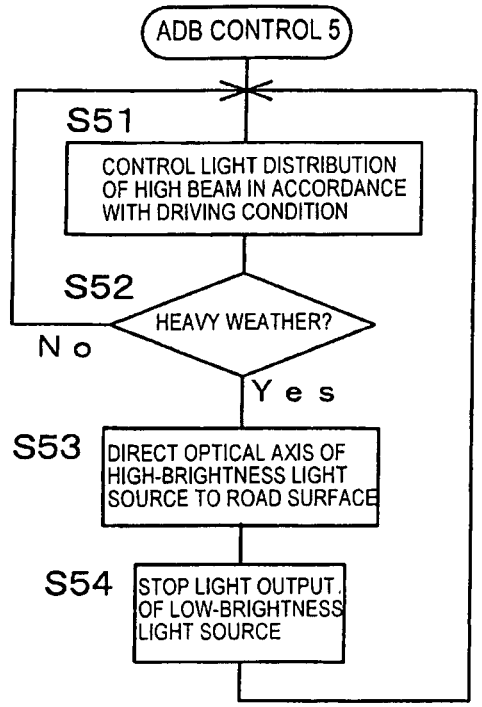
FIGS. 9A to 9C are operation explanatory views showing a fifth example of the ADB control.
Figure 9B:
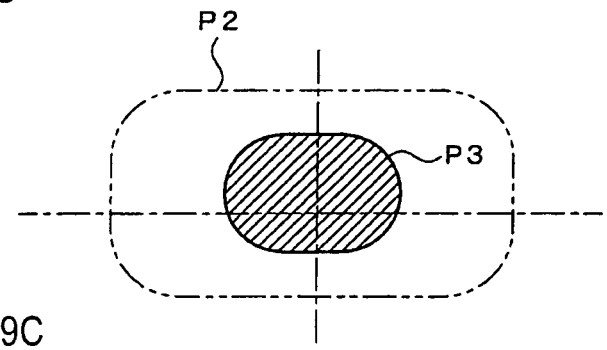
Figure 9C:
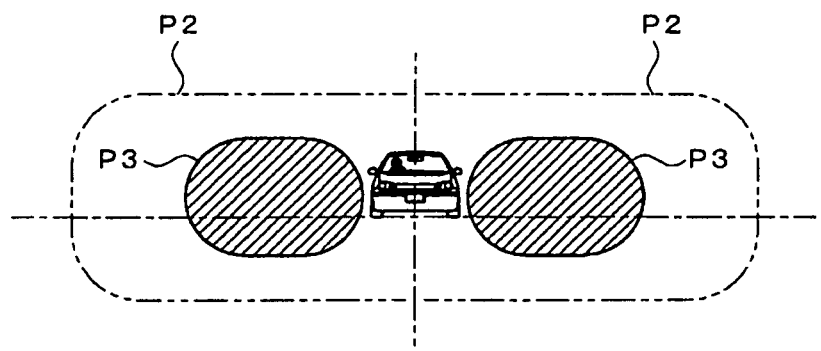

FIGS. 9 to 9C show a fifth example of the light distribution variable control (ADB control 5). Here, during the light distribution control of the low-brightness light source 11 and the high-brightness light source 13 (S51), the ADB control device 21 determines weather on the basis of the image data of the camera 31 or the operation signal of a wiper or a fog lamp, and directs an optical axis of the high-brightness light source 13 to a road surface (S53) when heavy weather such as rain or fog is determined (S52). In this way, as shown in FIG. 9B, the ADB control device 21 suppresses the upward spread of the spot high-beam pattern P3 and stops the light output of the low-brightness light source 11 (S54). Further, the ADB control device 21 suppresses the occurrence of light curtain by the high-beam pattern P2. In this state, as shown in FIG. 9C, the ADB control device 21 continues to perform the light distribution variable control only by the high-brightness light source 13 of the left and right headlamps 1. According to the control of the fifth example, the light output of the low-brightness light source 11 is stopped in association with the direction of the spot high-beam pattern P3 during the heavy weather. As a result, there is an advantage capable of suppressing the occurrence of the light curtain in the front of the vehicle and thus enhancing the visibility of own vehicle.

Meanwhile, the present invention is not limited to the above embodiment and examples. For example, the light output of the high-brightness light source can be controlled in accordance with various driving conditions of a vehicle, by determining a low-speed driving or a high-speed driving of the vehicle based on the speed information from a vehicle speed sensor, and changing the brightness of the spot high-beam pattern according to the determination result. In addition, a configuration of each part can be suitably modified without departing from the gist of the invention.

What is claimed is:

1. A vehicle lamp comprising:
    a low-beam unit that outputs a low-beam light distribution pattern, the low-beam unit comprising a low-beam light source;
    a high-beam unit that outputs a high-beam light distribution pattern, the high-beam unit comprising:
        a first high-beam light source that emits light of a first brightness, and
        a second high-beam light source that emits light of a second brightness higher than the first brightness;
    an actuator that changes the direction of light emitted from the first high-beam light source and the second high-beam light source; and
    an ADB control device that controls the light output of the second high-beam light source and the actuator so as to be associated with each other in accordance with a driving condition of a vehicle, wherein
    the first high-beam light source is a light-emitting diode (LED) and the second high-beam light source is a laser diode or the first high-beam light source is a low-brightness LED and the second high-beam light source is a high-brightness LED.

2. The vehicle lamp according to claim 1, wherein the ADB control device performs a control of lowering the light output of the second high-beam light source when the light emitted from the second high-beam light source is directed to an oncoming vehicle.

3. The vehicle lamp according to claim 1, wherein the ADB control device performs a control of lowering the light output of the second high-beam light source when the light emitted from the second high-beam light source is directed to a retro-reflective object.

4. The vehicle lamp according to claim 1, wherein the ADB control device performs a control of increasing the light output of the second high-beam light source when the light emitted from the second high-beam light source is directed to an extending direction of a curved road.

5. The vehicle lamp according to claim 1, wherein the ADB control device performs a control of changing the light output of the second high-beam light source from Low to High when the light emitted from the second high-beam light source is switched from downward to upward.

6. The vehicle lamp according to claim 1, wherein, during heavy weather, the ADB control device performs a control of directing an optical axis of the second high-beam light source toward a road surface and lowering the light output of the first high-beam light source.

7. A vehicle lamp comprising:
    a first light source that emits light of a first brightness;
    a second light source that emits light of a second brightness higher than the first brightness;
    an actuator that changes the direction of light emitted from the first light source and the second light source; and
    an ADB control device that controls the light output of the second light source and the actuator so as to be associated with each other in accordance with a driving condition of a vehicle,
    wherein, during heavy weather, the ADB control device performs a control of directing an optical axis of the second light source toward a road surface and lowering the light output of the first light source.

8. The vehicle lamp according to claim 7, wherein the ADB control device performs a control of lowering the light output of the second light source when the light emitted from the second light source is directed to an oncoming vehicle.

9. The vehicle lamp according to claim 7, wherein the ADB control device performs a control of lowering the light output of the second light source when the light emitted from the second light source is directed to a retro-reflective object.

10. The vehicle lamp according to claim 7, wherein the ADB control device performs a control of increasing the light output of the second light source when the light emitted from the second light source is directed to an extending direction of a curved road.

11. The vehicle lamp according to claim 7, wherein the ADB control device performs a control of changing the light output of the second light source from Low to High when the light emitted from the second light source is switched from downward to upward.

* * * * *